United States Patent [19]
Luke

[11] 3,729,997
[45] May 1, 1973

[54] LIQUID LEVEL SENSOR

[76] Inventor: Owen B. Luke, 51 Mitchell Road, Cape Elizabeth, Maine 04107

[22] Filed: Dec. 27, 1971

[21] Appl. No.: 212,163

[52] U.S. Cl. .......................73/302, 137/55, 137/386
[51] Int. Cl. ..............................................G01f 23/16
[58] Field of Search .........................73/302; 137/85; 235/200 WB; 137/386, 403

[56] References Cited

UNITED STATES PATENTS

| 2,736,199 | 2/1956 | Ibbot | 73/302 |
| 3,491,599 | 1/1970 | Baumann | 137/85 |

Primary Examiner—S. Clement Swisher
Assistant Examiner—Denis E. Corr
Attorney—Lee A. Strimbeck

[57] ABSTRACT

A device of the gas-bubbling type for determining the level of a body of liuqid comprises a dual-diaphragm, multiplying lever arrangement whereby the pressure necessary to effect bubbling is multiplied or amplified to a higher pressure which can be read directly as hydrostatic head and/or used to operate a control switch.

The sensor comprises two chambers, one at a low and the other at a high pressure. Each chamber has like diaphragms exposed to ambient pressure and connected by a lever mechanism whereby the movement of the low pressure diaphragm causes an opposite and greater movement of the high pressure diaphragm. The low pressure chamber receives the pressure necessary to effect bubbling through a conduit placed in the body of the liquid, the level of which is to be measured. The high pressure chamber receives instrument air (or other control gas) through a regulating valve operated by the high pressure diaphragm, and a small amount of air is continuously passed from the high pressure chamber through a throttling or needle valve into the low pressure chamber, and thence to the bubbler conduit in the liquid.

Because the control pressure is taken from the high pressure side of the sensor, a regular commercially available pressure-operated switch can be used with good results. Springs are not required to load the diaphgram. Instead, the sensor operates by mechanically balancing two pressures without the aid of springs, making it very sensitive and accurate, and the diaphragms can withstand over pressures without rupturing.

11 Claims, 4 Drawing Figures

Patented May 1, 1973 3,729,997

INVENTOR.
OWEN B. LUKE
BY
Lee A. Strimbeck
ATTORNEY

Patented May 1, 1973

INVENTOR.
OWEN B. LUKE

BY Lee A. Strimbeck

ATTORNEY

LIQUID LEVEL SENSOR

PRIOR ART

Air bubbling liquid level sensors are well known. See *Industrial Instruments for Measurement and Control*, Thomas J. Rhodes, McGraw-Hill Book Company, Inc., 1941, pp. 347–349.

The measurement of the pressure caused by the hydrostatic head is usually done directly, and if this pressure is used to operate a control switch such as a pressure-activated electrical switch operating a solinoid valve, the control action is insensitive because the pressure differential necessary to actuate the switch is such a large proportion of the total pressure available.

U.S. Pat. No. 2,600,193 (Hanney) and U.S. Pat. No. 3,181,556 (Baker) are illustrative systems of this type.

THIS INVENTION

In the present liquid level sensor, a small amount of a gas is continuously bubbled into a body of liquid, as is known. This trickle gas is provided by first passing an instrument gas at a relatively high pressure through a regulating valve into an inlet or high pressure chamber, then past a throttle (or needle) valve into an outlet or low pressure chamber and from there through a conduit to be bubbled into the liquid, which creates a pressure in the outlet chamber approximately equal to the pressure created by the hydrostatic head of the liquid, i.e., the pressure drop in the bubbler line is so small as to be inconsequential.

Each of the pressure chambers has a diaphragm, interconnected by an amplifying lever mechanism so that ratio of the pressure in the high pressure chamber to that in the lower pressure chamber is maintained essentially constant. The diaphragm on the high pressure chamber is connected by linkages to and serves to operate the valve regulating the flow of the measuring instrument gas.

The present sensing system is a dynamic one, not a static one, as its operation depends upon constant, but small, flow of gas through the system.

Since the pressure in the inlet-high pressure chamber is a multiple of the pressure in the outlet-low pressure chamber, it can be read as such to give a significant reading or the pressure gauge can be marked in feet of hydrostatic head and read as such. Also, the observed pressure can be used to directly operate a control valve or valves, to regulate the admission of liquid to and/or the removal of liquid from the body of liquid, the level of which is to be controlled.

When the term "observed" (or "observing") is used in the specification, it is meant to include effecting a control action as well as a direct visual reading. Also, when the term "liquid" is used, it is meant to include, besides pure liquids, mixtures such as mud or clay suspensions and psuedo-liquids such as fluidized solids, e.g., as in fluid catalytic cracking or in air classifiers.

Besides being used to gauge the level of liquids in tanks or containers such as water in a boiler or oil in a storage tank, the present invention can be used to gauge the liquid level in wells or the depth of mud layers by using the bubbler conduit as a probe. It is, of course, non-clogging because of the constant trickle-flow of gas. The components are simple, inexpensive, and easy to maintain and adjust. No springs are required, and diaphragms can be used that can stand excessive pressures without rupturing.

DRAWINGS

DESCRIPTION

Figure 1:
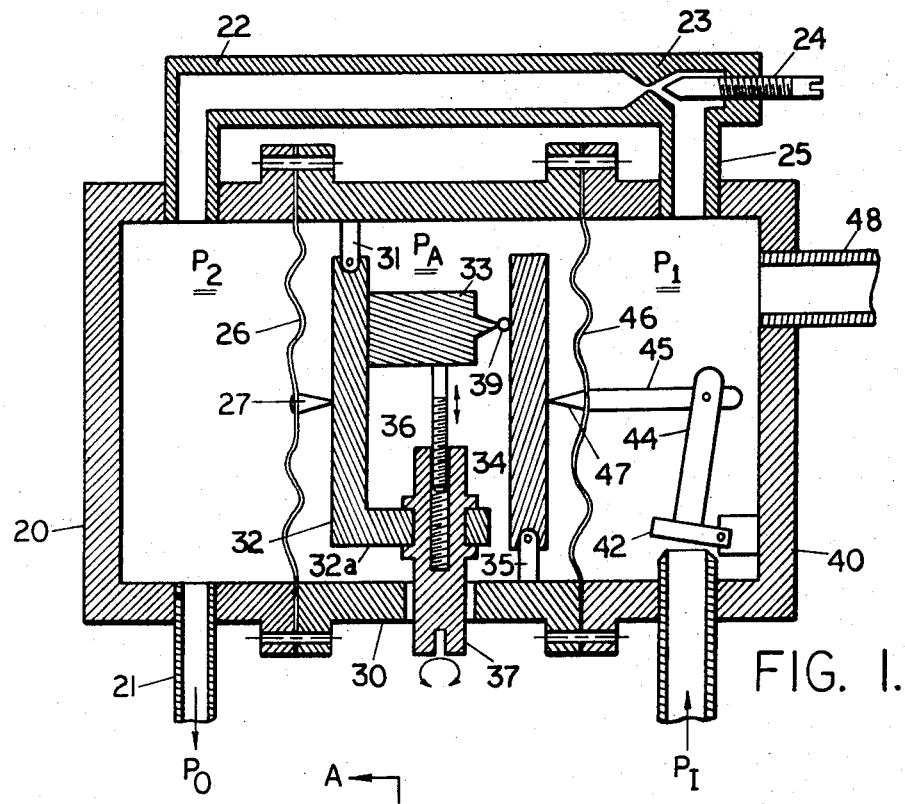
FIG. 1 is a sectional view of the sensing device, taken along line A—A of FIG. 2.
Figure 2:
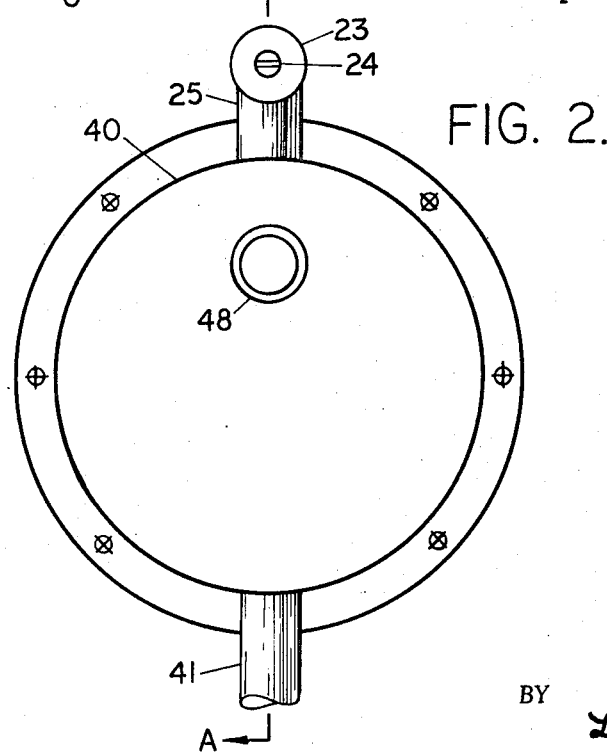
FIG. 2 is an end view of the sensor.

Referring to FIGS. 1 and 2, the liquid level measuring device of this invention has a body, circular as illustrated, composed of three sections: 20 which defines the outlet or low pressure chamber, 30 which defines the mid-section containing the lever-amplifying mechanism, and 40 which defines the inlet or high pressure chamber, which sections are suitably held together by flanges and bolts around their peripheries. Instrument air, or another suitable control gas, at a regulated pressure of $P_I$, e.g., 20 psig., is admitted to the high pressure chamber by line 41, flowing past a regulating valve 42 which reduces it to pressure $P_1$. The air then flows through line 25 through a needle valve having a body 23 and a stem 24 and then by line 22 into the low pressure chamber having a pressure $P_2$. From there it flows through line 21 into a body of liquid the level of which is to be observed. A hydrostatic pressure $P_0$ exists at the exit of line 21, which is usually substantially equal to pressure $P_2$.

The low pressure chamber has a diaphragm in one wall which has a central pivot piece 27 facing the mid-section which is maintained at ambient pressure $P_A$, e.g., atmospheric pressure. The high pressure chamber similarly has a diaphragm 46 with pivot piece 47. The diaphragms preferably have the same size and shape.

Supported by and between the pivot pieces 27 and 47 is an amplifying linkage mechanism 32 mounted for rotation at one end by support 31 affixed to wall 30, pivot block 33 supporting a pivot wheel 39, and a lever arm 34 mounted between pivot wheel 39 and pivot piece 47 and mounted for rotation, at the end opposite from that of lever 32 which is so mounted, by support 35 affixed to wall 30. The linkage causes the diaphragms to, at any one time, move in the same direction, i.e., while one is moving outwardly, the other is forced inwardly.

Without more, the amplification in motion given by the lever mechanism would remain constant, e.g., at a 5 : 1 ratio. It is, however, desirable to provide for some adjustability in this ratio and to this end the position of pivot block 33 is made to be slidably adjustable along the length of lever 32 by means of a position adjusting screw 36 and nut 37, held in place by an arm 32a on lever 32. The end of adjusting nut 37 is slotted so that it can be turned with a screwdriver. In this manner, the amplification, and thus the pressure ratio $P_2/P_1$ can be readily adjusted to be in the range of 2 : 1 to 10 : 1 or more.

The motion of diaphragm 46 is transmitted via linkages 44 and 45 and serves to tend to open or close valve 42.

Thus, considering that the hydrostatic head being measured is falling, pressure $P_2$ decreases causing diaphragm 26 to move outwardly from the mid-section and via the lever mechanism diaphragm 47 to move towards the mid-section, closing slightly valve 42. The pressure $P_1$ thus falls, counteracting the action of the diaphragm and lever mechanism. The change in pressure $P_1$ is observed via connection 48.

Figure 3:
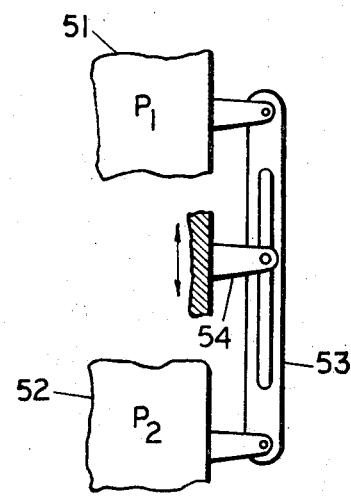
FIG. 3 is a schematic illustration of an alternative diaphragm-amplifying lever arrangement.

FIG. 3 illustrates another lever mechanism that can be used to amplify and transmit the pressure $P_1$ from the outlet chamber to the pressure $P_2$ in the inlet chamber. Here the pressure $P_1$ is contained by a bellows 51 and the pressure $P_2$ by a bellows 52. The bellows are interconnected by a slotted lever arm 53 which pivots about pivot 54. The position of pivot 54 can be adjusted along the length of the lever as shown to adjust the ratio $P_2/P_1$.

Figure 4:
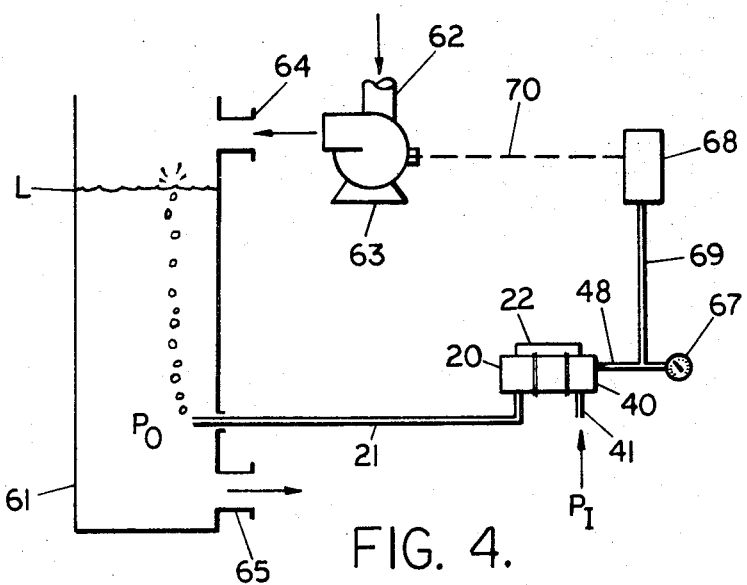
FIG. 4 is a flow diagram of one embodiment of the invention.

Turning to FIG. 4, illustrated is a control system for regulating the level L of water in a tank 61. Water is admitted to tank 61 by line 62, pump 63 and line 64, and is removed by line 65.

The sensing device is connected to the tank by line 21 from which a trickle of gas emerges at a pressure $P_0$. Instrument air is admitted to the sensing device by line 41 at a pressure of $P_I$ and the control impulse is taken off by line 48, which terminates in a pressure gauge 67. The gauge can be calibrated to read in feet of the level L above a datum level.

An air operated pressure switch 68 is connected to line 48 by line 69 and receives essentially pressure $P_2$. As the need arises, as level L falls, switch 68 via line 70 starts pump 63 and causes the liquid in tank 61 to be replenished. It has been found that the present sensing device will operate effectively on as little as 2 inches of water differential.

What is claimed is:

1. A liquid level sensing device comprising, in combination:
   a. an inlet chamber adapted to contain a gas having a pressure $P_1$ therein, one wall of which has an inlet diaphragm exposed to a pressure $P_A$,
   b. an outlet chamber adapted to contain a gas having a pressure $P_2$ therein, one wall of which has an outlet diaphragm exposed to said pressure $P_A$,
   c. a conduit connecting said inlet and outlet chambers and having gas flow throttling means therein,
   d. outlet conduit means adapted to connect said outlet chamber with the body of a reservoir of liquid, the level of which is to be sensed,
   e. inlet conduit means adapted to admit a gas at an inlet pressure of $P_I$ greater than said pressure $P_1$ to said inlet chamber and including therein a control valve operatively connected to said inlet diaphragm and adapted to tend to open with a decrease in said pressure $P_1$ and to tend to close with an increase in said pressure $P_1$,
   f. an inlet pivot point operating connected to said said inlet diaphragm on the $P_A$ pressure side thereof, and an outlet pivot point operatively connected to said outlet diaphragm on the $P_A$ pressure side thereof, and
   g. a lever mechanism operating on said inlet and outlet pivot points and adapted to amplify and transmit the force of one proportionally into a reverse force on the other.

2. The device of claim 1 wherein said gas flow throttling means and the proportioning given by said lever mechanism are adjustable and adapted to permit the ratio of $P_1/P_2$ to be set at a predetermined value, and to limit the amount of gas flowing through said outlet conduit means to a predetermined low level.

3. The device of claim 2 wherein said inlet and outlet diaphragms and pivot points face one another and said lever mechanism is mounted therebetween.

4. The device of claim 3 wherein said lever mechanism comprises:
   h. an inlet lever arm one end of which is mounted for rotation and the mid-section of which rests on said inlet pivot point,
   i. an outlet lever arm the end of which opposite the end of said inlet lever arm so mounted is mounted for rotation, and the mid-section of which rests on said outlet pivot point,
   j. a pivot block intermediate and operatively connecting said inlet and outlet lever arms, one end of which is adapted to serve as an intermediate pivot point, said intermediate pivot point being spaced from the line of said inlet and outlet pivot points in the plane given by the three pivot points along the line of said lever arms.

5. The device of claim 4 wherein the spacing of said intermediate pivot point from the line of said inlet and outlet points is adjustable by moving said pivot block along said lever arms whereby said ratio of $P_1/P_2$ can be set at said predetermined value.

6. The device of claim 1 including means connecting to said inlet chamber for observing said pressure $P_1$ and for translating the same into the level of said liquid above a datum level.

7. The device of claim 1 including control means connected to said inlet chamber and operated by the pressure $P_1$ thereon.

8. In the determination of the level of a body of a liquid wherein a small amount of a gas is bubbled into said body, and the pressure $P_0$ of said gas necessary to effect such bubbling is observed, the improvement comprising:
   a. passing said gas at an initial inlet pressure $P_I$ through a regulating valve into an inlet chamber maintained at a pressure $P_1$, then through a throttling valve set to give a predetermined pressure drop into an outlet chamber maintained at a pressure $P_2$, which is substantially the same as said pressure $P_0$, and thence into said body, while maintaining the ratio of $P_1/P_2$ at a predetermined value by increasing the flow of said gas into said inlet chamber by operation of said regulating valve if said ratio should tend to decrease, and vice-versa, and
   b. observing said pressure $P_1$ as a predetermined multiple of said pressure $P_0$.

9. The determination of claim 8 wherein the observing of said pressure $P_1$ is translated into the level of said liquid above a datum level.

10. The determination of claim 8 wherein said observing of said pressure $P_1$ is translated into a control action to control said level.

11. The determination of claim 8 wherein said ratio of $P_1/P_2$ is maintained by two diaphragms, one of which is responsive to pressure $P_1$ and the other to pressure $P_2$, with the two diaphragms being interconnected by an adjustable proportioning lever mechanism, and the $P_1$ diaphragm is operatively connected to and serves to dictate the movement of said regulating valve.

* * * * *